Dec. 1, 1942.    R. C. LAMOND    2,303,847
TOWING MACHINE
Filed Aug. 1, 1939    4 Sheets-Sheet 2

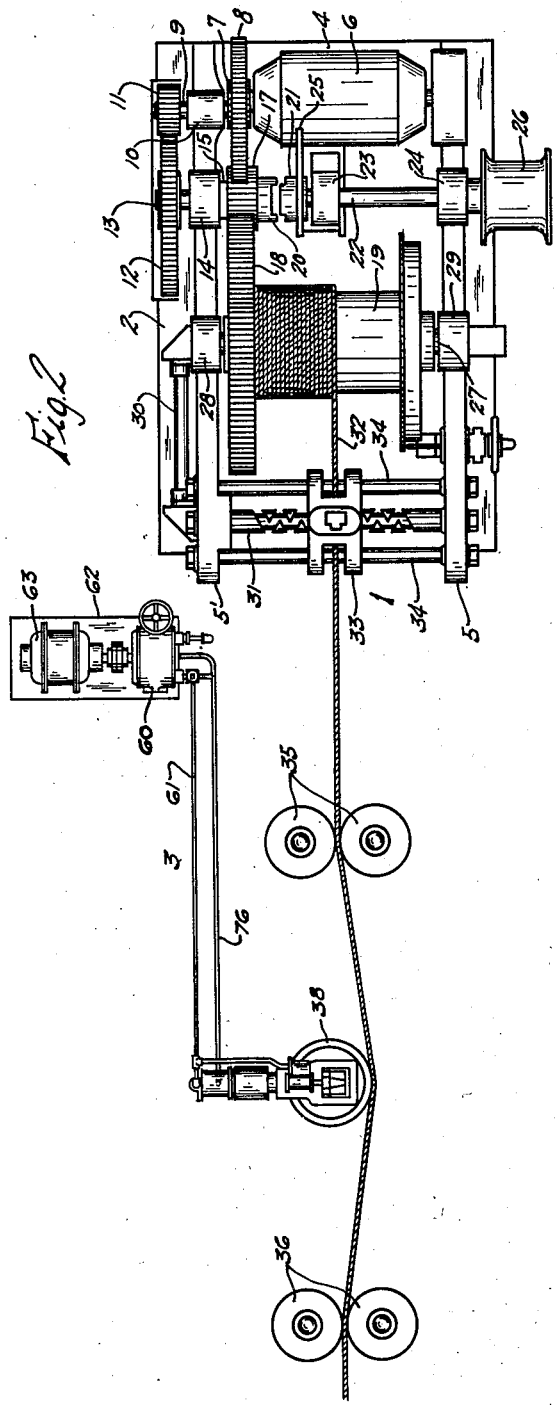

Inventor
Robert C. Lamond
By *[signature]*
Attorney

Dec. 1, 1942.     R. C. LAMOND     2,303,847
TOWING MACHINE
Filed Aug. 1, 1939     4 Sheets-Sheet 3

Inventor
Robert C. Lamond
By [signature]
Attorney

Dec. 1, 1942.  R. C. LAMOND  2,303,847
TOWING MACHINE
Filed Aug. 1, 1939  4 Sheets-Sheet 4

Inventor
Robert C. Lamond
By [signature]
Attorney

Patented Dec. 1, 1942

2,303,847

UNITED STATES PATENT OFFICE 2,303,847

TOWING MACHINE

Robert C. Lamond, Philadelphia, Pa., assignor to American Engineering Company, Philadelphia, Pa., a corporation of Pennsylvania Application August 1, 1939, Serial No. 287,723

7 Claims. (Cl. 254—173)

This invention relates to towing machines, and more particularly to control devices associated with such machines.

One object of the present invention is to provide in a towing machine a control mechanism which functions to maintain the cable taut and at a predetermined length under all conditions of operation.

A more specific object is to provide a novel and highly efficient, automatically operable control mechanism for the winch of the towing machine which operates to maintain the towing cable taut by causing said winch to wind in cable when slack occurs therein, and to pay out cable when abnormal loads are imposed thereon, and also under certain conditions to so control the operation of said winch that a predetermined length of cable is maintained between the towing machine and the object towed.

Other and further objects will become apparent as the description of the invention progresses.

Of the drawings:

Fig. 1 is a side elevational view of the improved towing machine showing the position that it assumes on the deck of a vessel.

Fig. 2 is a plan view of the apparatus shown in Fig. 1.

Fig. 11 is a fragmentary view with parts thereof shown in section of a further embodiment of the present invention.

Figure 7:
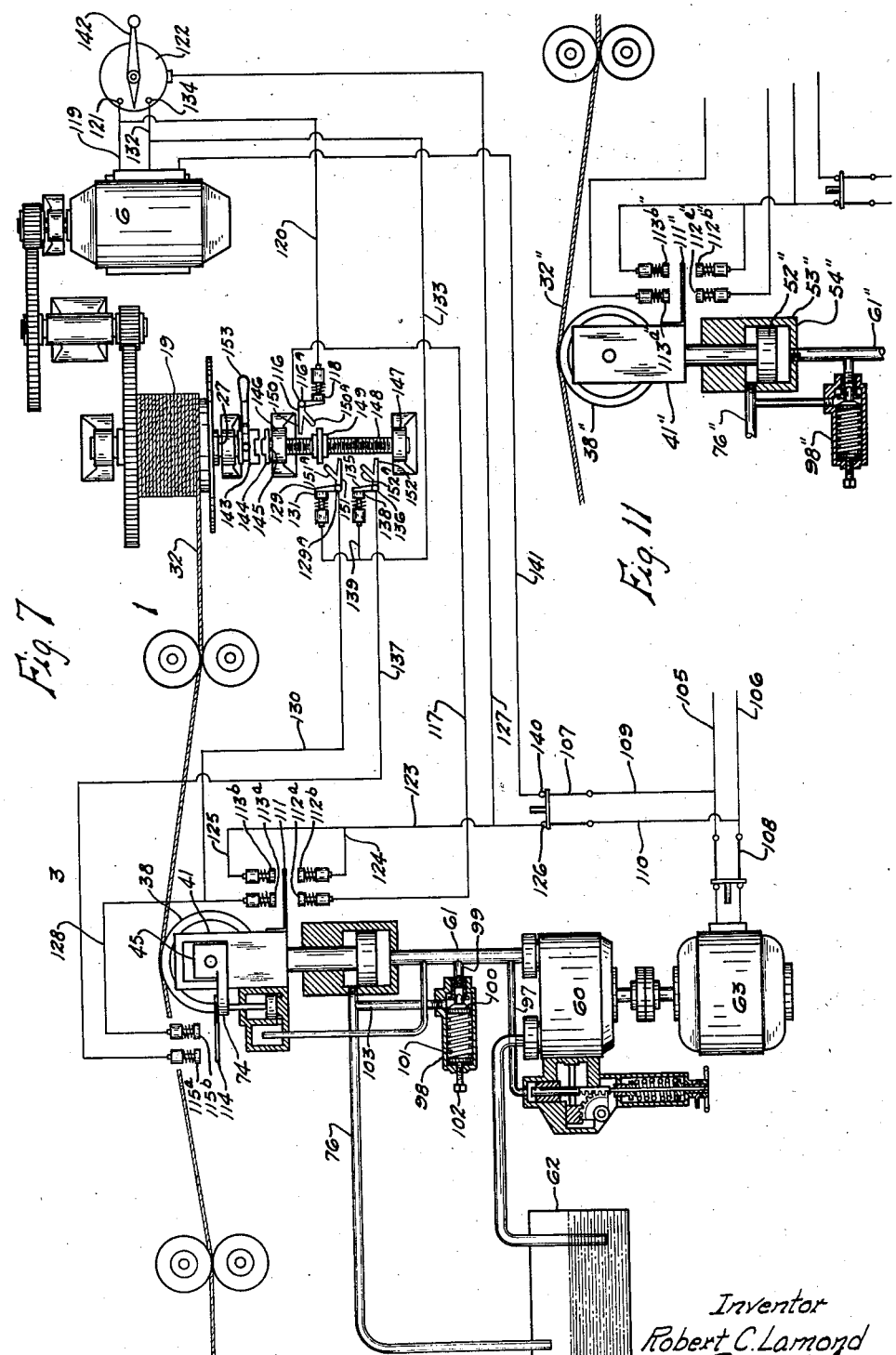
Fig. 7 is a partially diagrammatic view of the entire apparatus including a wiring diagram of the electrical connections, certain of the parts being shown in section to more clearly illustrate the structure thereof.

Referring more particularly to Figs. 1, 2 and 7 of the drawings, the numeral 1 indicates generally the entire towing mechanism including a winch, and a control mechanism therefor indicated generally at 3. Winch 2 comprises a frame structure including a base member 4 supported on deck D and side frames 5 and 5'. Suitably mounted on base member 4 is an electric motor 6 having a pinion 7 mounted on the armature shaft thereof which meshes with a large gear 8. Gear 8 is secured to one end of a shaft 9, suitably mounted in a bearing 10 provided in side frame 5. The outer end of shaft 9 has secured thereto a gear 11 which meshes with a large gear 12, secured to the outer end of a shaft 13 journaled in a second bearing 14 also provided in side frame 5. The other end of shaft 13 has secured thereto an enlarged sleeve 15 to which is secured a gear 17 which meshes with a large gear 18 secured to one end of a winding drum 19. The outer end of sleeve 15 has formed thereon a clutch element 20 adapted to engage a complementary clutch member 21, keyed to a shaft 22, rotatably mounted in bearings 23 and 24. A lever 25 is provided to shift clutch element 21 into engagement with element 20 when it is desired to employ the drum head 26 provided at the outer end of shaft 22.

Winding drum 19 is secured to a shaft 27 mounted in bearings 28 and 29. Any suitable gearing 30 is provided between shaft 27 and a reversible screw shaft 31, whereby the latter is driven by shaft 27. A cable 32 is wound on drum 19 and extends through a guide block 33 making threaded engagement with, and actuated by shaft 31. Block 33 is held against rotary movement by a pair of guide rods 34 secured to and extending between side frames 5 and 5'. After passing through guide block 33 cable 32 extends between spaced pairs of guide pulleys 35 and 36, and the free end thereof may be rigidly secured to the object to be towed. The cable 32 is engaged intermediate pulleys 35 and 36 by a flange pulley 38, which forms a portion of the control apparatus comprising the present invention.

Figure 3:
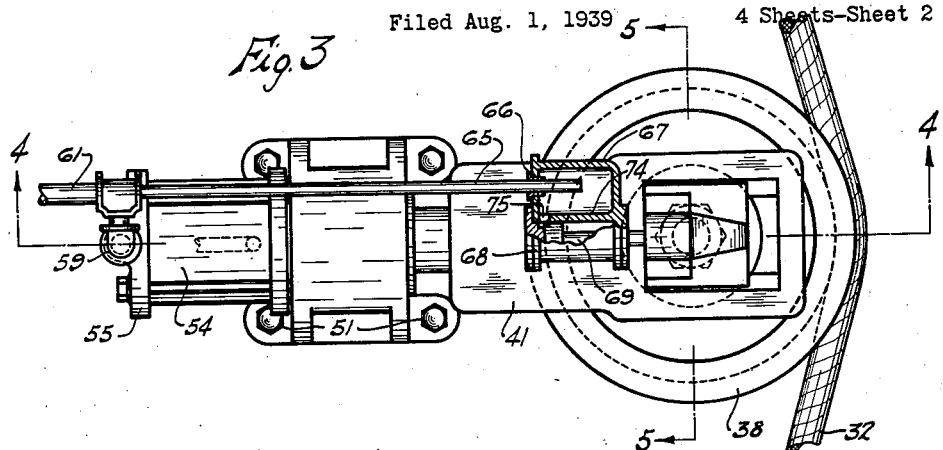
Fig. 3 is an enlarged plan view of a portion of the control apparatus comprising the present invention.
Figure 4:
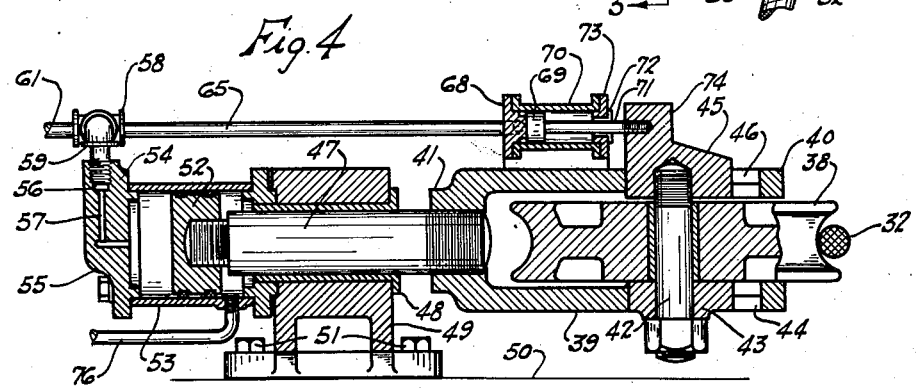
Fig. 4 is a sectional view taken substantially along line 4—4 of Fig. 3.
Figure 5:
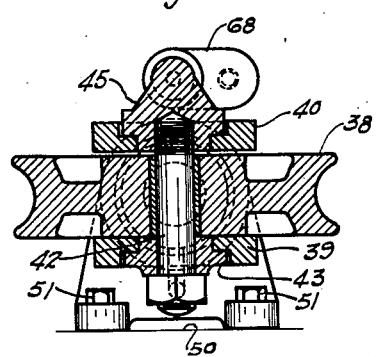
Fig. 5 is a sectional view taken substantially along line 5—5 of Fig. 3.

Pulley 38, as will be observed upon reference to Figs. 3 to 5, extends between the arms 39 and 40 of a bifurcated member 41, and is rotatably mounted upon a pintle 42. Pintle 42 extends through an aperture provided in a sliding block 43 operating in a rectangular slot 44 provided near the outer end of arm 39, and the upper end thereof makes threaded engagement with a second sliding block 45 operating in a rectangular slot 46 provided near the outer end of arm 40. Member 41 has secured thereto one end a slidable rod 47 mounted for reciprocation in a bushing 48 extending through the central bore of a bracket 49, secured to the raised deck 50 of the vessel by bolts 51. The other end of rod 47 makes threaded engagement with a piston 52 operating in a cylinder 53 of a fluid motor 54. The left hand end plate 55 (Figs. 3 and 4) of motor 54 has provided therein a port 56 and a passage 57, which enters the left hand end of cylinder 53. Port 56 is connected to a T pipe coupling 58 by piping 59. One end of coupling 58 is connected to the discharge side of a variable stroke pump 60 by means of a pipe 61. Pump 60 is mounted upon a fluid makeup tank 62 supported on deck D, and is driven by any suitable mechanism, such as by an electric motor 63. Fluid is drawn into pump 60 from makeup tank 62 through a pipe 64, and is discharged therefrom through the pipe 61.

One end of a pipe 65 is connected to the other end of coupling 58 and extends through a suitable packing gland 66 provided in a cylinder 67 secured to the upper surface of member 41. Integral with cylinder 67 is a relatively small fluid motor 68. Motor 68 comprises a piston 69 operating in a cylinder 70. A rod 71 secured to piston 69 extends through a packing gland 72 provided in the end wall 73 of motor 68, and the outer end thereof makes threaded engagement with the extended portion 74 of sliding block 45. An opening 75 is provided at the left hand end (Fig. 3) of the common wall 74 of cylinders 67 and 70, and consequently any fluid entering cylinder 67 through pipe 65 will flow through the opening 75 and into the left hand end of cylinder 70. The pressure of this fluid on the piston 69 tends to move it, and consequently sliding blocks 45 and 43, and pulley 38, to the right. The right hand end of cylinder 53 is connected to makeup tank 62 by means of a pipe 76, whereby any leakage past piston 52 will drain back to the makeup tank. The pressures to which pistons 52 and 69 of motors 54 and 68 are to be subjected may be varied by means of a control mechanism indicated generally by the numeral 77.

Figure 6:
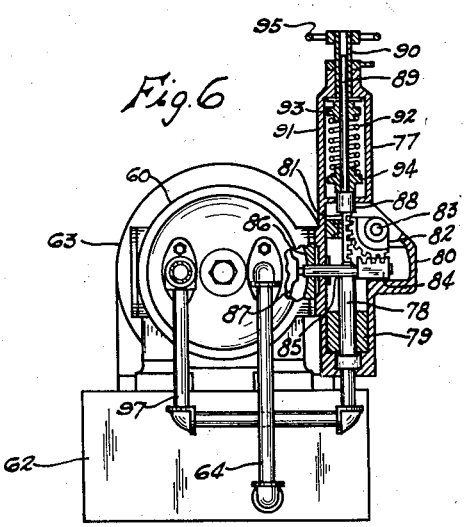
Fig. 6 is an end view partly in section of a pump and control mechanism therefor, forming a portion of the control mechanism comprising the present invention.

This control mechanism is similar in construction and operation to that shown in Patent No. 2,029,493, and accordingly a detailed description thereof is unnecessary. This control mechanism, as will be observed upon reference particularly to Fig. 6, comprises a piston 78 mounted in a cylinder 79 provided at the lower end of bracket casing 80, secured to pump 60 in any suitable manner. Piston 78 has provided at the upper end thereof a rack 81 which engages a segmental gear 82 pivotally mounted at 83 in the bracket casing 80. Gear segment 82 meshes with a horizontally disposed rack 84 secured to the outer end of a guide rod 85. Guide rod 85 extends through an aperture provided in the end wall 86 of the casing of pump 60, and is secured at the inner end thereof to the sliding block 87 of said pump. Pump 60 is of a well known construction, and for a complete description thereof reference may be had to Patent No. 1,077,979.

The upper end of rack 81 engages the enlarged portion 88 of a rod 89. The upper end of rod 89 extends through a sleeve 90 which makes threaded engagement with the vertically disposed bore provided in the upper end of the tubular casing 91 of the control mechanism 77. A coil spring 92 extends between spring seats 93 and 94, the former of which engaging the upper end of casing 91, and the lower end of sleeve 90, while the latter engages the upper end of enlarged portion 88 of rod 89. A hand wheel 95 is secured to the upper end of sleeve 90. Consequently, to place pump 60 on stroke, hand wheel 95 is manipulated to compress spring 92 which, through rack 81, segment 82, and rack 84, effects an adjustment of the sliding block 87 of the pump to on-stroke position. The lower end of cylinder 79 in which piston 78 operates is connected to pipe 61 by a branch pipe 97. Consequently the pressure in pipe 61 will be communicated to the lower end of piston 78, and when this pressure exceeds the pressure of spring 92 piston 78 will move upwardly to return the pump controls 87 to neutral position through racks 81, segmental gear 82, and rack 84, as previously described. It therefore is seen that by adjusting the pressure of spring 92 different predetermined pressures may be imposed upon pistons 52 and 69 by pump 60. To prevent the development of excessive pressures in the system a relief valve 98 is provided. This valve is connected to pipe 61 by a pipe 99, and comprises a valve element 100 normally retained upon its seat by a spring 101. The tension of spring 101 may be adjusted by a set screw 102. A branch pipe 103 connects valve 98 to pipe 76, which in turn is connected to makeup tank 62. Accordingly, upon the unseating of valve 100 fluid from pump 60 will bypass to exhaust through pipes 99, 103 and 76.

Electric current is supplied to motors 6 and 63 from a pair of bus bars 105 and 106, which in turn may be connected to any suitable source of supply. Switches 107 and 108 may be employed to interrupt the circuits to motors 6 and 63, respectively, the former being connected to bus bars 105 and 106, by conductors 109 and 110, respectively. As shown more particularly in Fig. 7, bifurcated member 41 has secured thereto and extending laterally therefrom, a contact plate 111 which is adapted to make contact with pairs of contact elements 112$^a$, 112$^b$, and 113$^a$, 113$^b$. Portion 74 of sliding block 45 has also extending laterally therefrom a contact plate 114 which is adapted to make contact with a third pair of contact elements 115$^a$, 115$^b$. Contact element 112$^a$ is connected to a switch element 116 of a single pole switch 116$^A$ by a conductor 117. Switch element 116 normally engages a contact element 118 which is connected to a conductor 119 by a conductor 120. Conductor 119 is connected at one end to motor 6, at the other end to a pole 121 of a switch 122, which affords a manual control for motor 6. Contact elements 112$^b$ and 113$^b$ are connected in parallel to a conductor 123 by conductors 124 and 125 respectively, conductor 123 in turn being connected to the pole 126 of switch 107, and a conductor 127 connects conductor 123 to switch 122. Contact elements 113$^a$ and 115$^b$ are connected by a conductor 128 which in turn is connected to a switch element 129 of a single pole switch 129$^A$ by a conductor 130. Switch element 129 is adapted to make contact with a contact element 131, which in turn is connected to a conductor 132 by a conductor 133. Conductor 132 is connected at one end to motor 6, and at the other end to the pole 134 of switch 122. Contact element 115$^a$ is connected to a switch element 135 of a third single pole switch 136 by a conductor 137. The contact element 138 of switch 136 is also connected to the conductor 133 by a conductor 139. The other pole 140 of switch 107 is connected to motor 6 by a conductor 141, thus completing the circuit.

Switch 122 comprises a contact arm 142 which, when moved into engagement with pole 121, causes operation of motor 6 in such a direction as to cause drum 19 to pay out cable, and when moved into engagement with pole 134 the motor operates in the reverse direction to cause the drum to wind in cable.

As shown more particularly in Fig. 7, shaft 27 has slidably mounted thereon a clutch element 143 which is adapted to engage a complementary clutch element 144, secured to a shaft 145 journaled in bearings 146 and 147. The portion 148 of shaft 145 disposed between bearings 146 and 147 is provided with screw threads, and has mounted thereon a traveling nut 149. When traveling nut 149 approaches its limit of movement toward bearing 146 it is adapted to engage the arm 150 of switch element 116, and thereby open switch 116A. Now should motor 6 be operated in the reverse direction, traveling nut will move in the reverse direction and engage arm 150A to close switch 116A. Continued movement of traveling nut 149 toward bearing 147 will first bring it into engagement with arm 151 of switch element 129 to open switch 129A. Continued movement of traveling nut 149, as will appear more fully hereinafter, causes opening of switch 136 by engagement of said nut with arm 152 of switch element 135. Now upon a reverse movement of nut 149 it will first engage arm 152A of element 135 to close switch 136 and upon continued movement thereof it will engage arm 151A of element 131 to close switch 129A. Clutch element 143 may be moved into or out of engagement with element 144 by means of a shifting lever 153.

Figure 8:
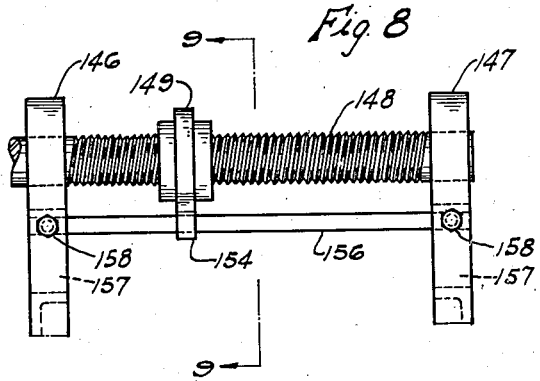
Fig. 8 is a side view of the screw shaft and traveling nut mechanism for operating certain of the switches of the control mechanism.
Figure 9:
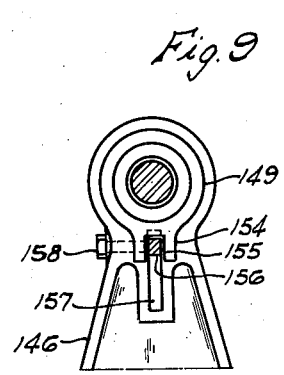
Fig. 9 is a sectional view taken substantially along line 9—9 of Fig. 8.

Traveling nut 149 may be positioned with respect to switches 116A, 129A and 136 by manipulation of clutch element 143 into or out of engagement with element 144 during operation of winch 2 preliminarly to the towing of an object, or by turning the nut manually. Referring to Figs. 8 and 9, the lower end of nut 149 has provided thereon a depending portion 154 having an open rectangular slot 155 for receiving a rod 156. The ends of rod 156 extend into aligned vertical slots 157 provided beneath bearings 146 and 147. Rod 156 may be held in the position shown in Figs. 8 and 9 by stud bolts 158. Thus by loosening bolts 158 rod 156 will drop free of slot 155, and nut 149 may now be turned manually until the desired position on shaft 148 is reached. Rod 156 is then moved upward into engagement with slot 155 to prevent rotary movement of nut 149 during operating periods of the machine.

From the foregoing description it is seen that to operate the device the cable 32 is attached to the vessel or object to be towed. The contact arm 142 of switch 122 is moved into engagement with pole 121, thereby causing motor 6 to so operate winding drum 19 as to pay out cable. This operation is continued until the desired length of cable has been paid out. During this operation the position of traveling nut 149 may be properly set by manipulation of clutch element 143 into or out of engagement with clutch element 144. Proper adjustment of nut 149 may also be made manually as just described. When the proper length of cable has been paid out clutch elements 143 and 144 are engaged so that any further movement of drum 19 will now cause a corresponding movement of traveling nut 149. To insure the maintenance of the predetermined length of cable between the towing machine and the object being towed, nut 149 is positioned between switches 116A and 129A adjacent arm 151 of switch element 129. Pump 60 is now placed on stroke by manipulation of hand wheel 95.

The spring 101 of relief valve 98 is also adjusted so that the fluid discharging into pipe 61 from pump 60 will by-pass to exhaust when a predetermined pressure has been reached. Upon adjustment of pump 60 in this manner fluid from said pump now discharges into pipe 61 and causes operation of piston 52 outward to move pulley 38 into engagement with cable 32. Piston 69 also has a tendency to move outwardly. However, it will be noted that piston 69 is relatively small as compared with piston 52, and consequently if cable 32 is comparatively taut it will move piston 69 to the position shown in Fig. 7. Piston 52, however, being relatively large in diameter will move to fully operated position. When this occurs contact plate 111 provided on member 41 engages elements 113a and 113b, thereby completing the circuit to motor 6 and causing drum 19 to wind in cable. As shown in Fig. 7, current now flows from bus bar 106 through conductor 110, switch 107, conductors 123 and 125, contact element 113b, plate 111, contact element 113a, conductor 130, switch 129A, conductor 133 and conductor 132. The current passing through motor 6 is returned to the bus bar 105 through conductor 141, switch 107 and conductor 109. Drum 19 continues to wind in cable until traveling nut 149 engages arm 151 of switch element 129, thereby interrupting the circuit to motor 6. The amount of cable wound in is relatively small since it will be remembered that traveling nut 149 was positioned immediately adjacent arm 151 of switch 129A. The parts will now remain in this position during normal towing operation.

Should the sea be relatively rough so as to impose uneven loads on the cable, the cable should be paid out to prevent snapping thereof under heavy loads, and wound in again as soon as the load is reduced. Thus when a heavier than normal load is imposed on the cable element 41 will move inwardly thereby breaking contact between plate 111 and elements 113a and 113b, causing the fluid behind piston 52 to discharge to exhaust through relief valve 98. Contact plate 111 will now be brought into engagement with contact elements 112a and 112b, thereby completing the circuit to motor 6 through switch 116A, thereby causing the motor 6 to actuate drum 19 so as to pay out cable. This will continue until the load is relieved on the cable 32, at which time piston 52 will again urge member 41 and pulley 38 outwardly, thereby breaking contact with elements 112a and 112b, and again making contact with elements 113a, 113b. This will cause motor 6 to operate drum 19 to wind in cable again as previously described, until traveling nut 149 again engages arm 151 when the circuit to motor 6 is interrupted. When the circuit is so interrupted the cable is at the desired predetermined length.

It is to be noted that during operation of the device contact plate 111 engages either contact elements 113a, 113b or elements 112a, 112b.

During the towing operation, should slack occur in the cable after switch 129A has been opened by unit 149, piston 69 will urge contact plate 114 into engagement with contact elements 115a and 115b thereby reestablishing the circuit to motor 6 and causing the latter to operate drum 19 to continue to wind in cable. This will continue until the slack is taken up and the normal load reestablished, at which time cable 32 urges pulley 38, and consequently contact plate 114, inwardly, thereby interrupting the circuit to the motor 6. A load sufficient to urge plate 111 into engagement with elements 112a and 112b will effect a reversal of motor 6 and cause nut 149 to travel in the reverse direction. Nut 149 will now engage arm 151A and again close switch 129A. In this manner cable 32 is maintained taut throughout the operation of the device and consequently snapping of the cable due to sudden loads is practically eliminated.

Should slack continue to occur in the cable, drum 19 would continue to wind it in until traveling nut 149 engages the arm 152 of limit switch 136, thereby opening the latter and interrupting the circuit to motor 6. The same is true in case the motor should actuate drum 19 to continue paying out cable. This would continue until switch 116A is opened by the engagement of arm 150 and traveling nut 149, when the motor will again be brought to rest. This will prevent an undue quantity of cable from being unwound from drum 19.

It is apparent that switches 116A, 129A and 136 may also be adjusted with respect to traveling nut 149, if desired.

From the foregoing description it is seen that a flexible and highly efficient towing mechanism has been provided. The electrical control system functions not only to prevent snapping of the cable by permitting the winding drum to pay out cable when heavy loads occur, but under certain conditions to wind in the cable so paid out as soon as the load again assumes a normal condition. Limit switches are also provided to prevent overtravel of drum 19 in either direction.

Figure 10:
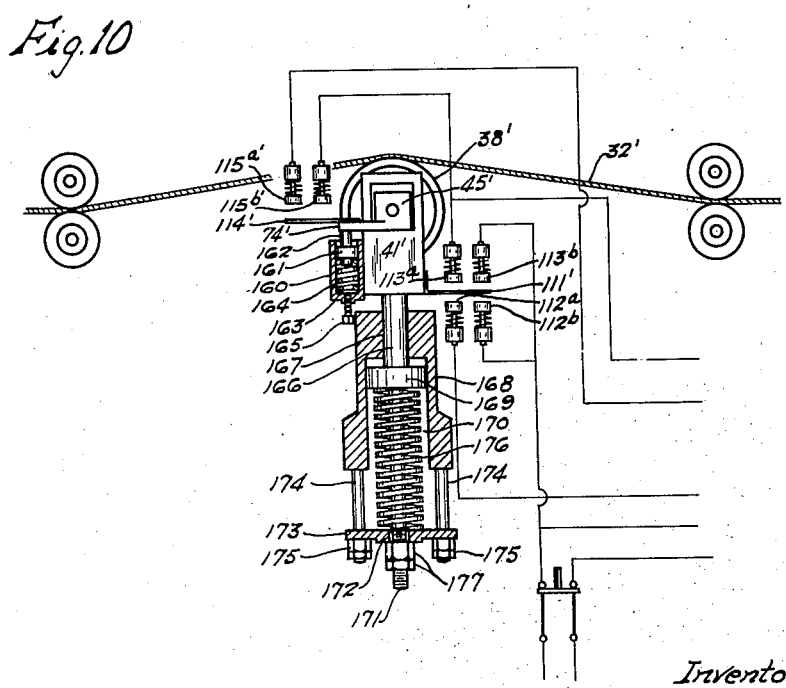
Fig. 10 is a fragmentary view partly in section of an alternative control mechanism.

Fig. 10 illustrates a slightly modified embodiment of the invention wherein spring means are employed instead of fluid motors to control the operation of the towing machine. In this construction also it will be observed that a bifurcated member 41' carries a flanged pulley 38' which engages the cable 32'. Pulley 38' is mounted in a pair of sliding blocks, the upper sliding block 45' of which being shown. The extended portion 74' of sliding block 45' has secured thereto a contact plate 114', which is adapted to engage contact elements 115a' and 115b'. Secured to member 41' is a cylinder 160 having a piston 161 operating therein, the upper end of the rod 162 of piston 161 being in engagement with the portion 74' of sliding block 45'. Extending between piston 161 and a spring seat 163 is a coil spring 164. A set screw 165 extending through the end wall of casing 160 and operating against spring seat 163 is provided to adjust the pressure of spring 164. Thus when spring 164 is placed under compression it tends to urge piston 161, and consequently sliding block 45' and pulley 38' outwardly. By this movement of sliding block 45' contact plate 114' is also brought into engagement with contact elements 115a and 115b.

Bifurcated member 41' has secured to one end thereof a rod 166 which extends through the cylindrical bore 167 provided at one end of a bracket 168. The other end of rod 166 has secured thereto a piston 169 which operates in an open cylinder 170 provided at the other end of bracket 168. A relatively small rod 171 is secured to the other end of piston 169 and extends through an enlarged aperture 172 provided centrally of a crosshead 173. Crosshead 173 is supported on a pair of guide rods 174 secured to and extending outwardly from the end of bracket 168, and lock nuts 175 secured to the end of rods 174 retain crosshead 173 in position. A coil spring 176 encircles rod 171 and extends between piston 169 and the inner surface of crosshead 173. A pair of nuts 177 making threaded engagement with the end of rod 171 is provided to adjust the pressure of spring 176.

Secured to and extending laterally from bifurcated member 41' is a contact plate 111' which when moved upwardly is adapted to engage contact elements 113a', 113b', and when moved downwardly is adapted to engage contact elements 112a' and 112b'. The electrical connections associated with contact elements 112a', 112b', 113a', 113b' and 115a', 115b' are identical with those shown in Fig. 7, and accordingly a description thereof will not be repeated.

Upon inspection of the construction shown in Fig. 10 it will be observed that spring 164 is relatively small, and accordingly when cable 32' is taut it will urge pulley 38', and consequently sliding block 45' inwardly, thereby breaking contact between plate 114' and elements 115a', 115b'. Spring 164, however, will urge contact plate 114' into engagement with elements 115a' and 115b' when slack occurs in the cable, thereby completing the circuit to the winch operating motor (not shown) to cause the same to wind in cable, as previously described. Spring 176, however, being relatively strong will urge member 41' outwardly and maintain contact between plate 111' and elements 113a' and 113b' causing the motor to operate the winding drum to wind in cable until the circuit is interrupted by the traveling nut, as previously described. On the other hand, when an undue load is imposed upon cable 32 member 41' is urged downwardly against the pressure of spring 176 bringing plate 111' into engagement with elements 112a', 112b', thereby conditioning the winch operating motor to actuate the winding drum in the reverse direction to pay out cable until this load is again relieved, when spring 176 urges plate 111' into engagement with elements 113a' and 113b'. These operations are repeated periodically during operation of the device.

Fig. 11 illustrates a further embodiment of the present invention wherein the small piston 69, contact plate 114, contact elements 115a and 115b, as well as the connections between these elements and the switches associated with the towing winch, shown more particularly in the embodiment illustrated in Fig. 7, are dispensed with. In the construction also a pulley 38" engages a cable 32" and is mounted for operation in a bifurcated member 41". Bifurcated member 41" is actuated by a piston 52" operating in the cylinder 53" of a fluid motor 54". Motor 54" is operated in one direction by a pump (not shown), the fluid therefrom being delivered to said motor by a pipe 61". The upper end of cylinder 53" is connected to exhaust by a pipe 76", thereby providing a drain for any fluid leaking past piston 52". A relief valve 98", similar to the relief valve 98, is connected to pipe 61", whereby fluid delivered to piston 52" may bypass to exhaust in the event the pressure in the system exceeds a predetermined value.

Bifurcated member 41" has extending laterally therefrom a contact plate 111" which when moved downwardly by operation of cable 32" is adapted to engage contact elements 112a", 112b", and when said plate is moved upwardly by the action of piston 52" it engages contact elements 113a" and 113b". The connections between these contact elements and the switches and motor means associated with the towing winch (not shown) are identical with those shown in Fig. 7, and accordingly a description thereof need not be given. In this construction it is seen that when piston 52' moves to its upper position of adjustment plate 111' makes contact with elements 113a'' and 113b'', thereby completing the circuit to the winch operating motor, which causes cable to be wound in. This continues until the circuit to the motor is interrupted by operation of the traveling nut associated with the cable winding drum on a switch element mounted adjacent thereto. On the other hand, when an unusual load is imposed upon cable 32'' bifurcated element 41'' is moved downwardly, bringing plate 111'' into engagement with contact elements 112a'', 112b'', thereby causing the winch operating motor to actuate the winding drum so as to pay out cable. This continues until a normal load is established whereupon piston 52 again actuates bifurcated member 41'' upwardly, causing plate 111'' to again engage contact elements 113a'' and 113b''. This operation is repeated several times during a towing operation, especially when rough weather is encountered at sea.

While the embodiments herein described are admirably adapted to fulfill the objects primarily stated, it is to be understood that the invention is not to be limited thereto, since it may be embodied in other forms, all coming within the scope of claims which follow.

What is claimed is:

1. In a towing device, the combination of a winch including a cable winding drum and an electric motor for actuating said drum to wind in or pay out cable, an electric circuit for operating said motor, manually operable switch means in said circuit for controlling the operation of said motor, an automatic mechanism, said automatic mechanism including a plurality of switches in said circuit, movable means in engagement with said cable for closing one of said plurality of switches to cause said drum to wind in cable when said movable means is actuated in one direction, adjustable means for actuating said movable means against the pressure exerted thereon by said cable, said movable means being actuated in the reverse direction by said cable to effect closing of a second of said plurality of switches to reverse said motor thereby causing said drum to pay out cable when the pressure imposed on said movable means by said cable exceeds that imposed thereon by said adjustable means, a normally closed control switch in said circuit, means operated by said drum for opening said last mentioned switch when a predetermined length of cable extends between said drum and the object in tow, and a second movable means engaging said cable for closing a third of said plurality of switches to cause said motor to actuate said drum to wind in cable when undue slack occurs therein.

2. In a towing device, the combination of a winch including a cable winding drum, and an electric motor for actuating said drum to wind in or pay out cable, an electric circuit for operating said motor, manually operable switch means in said circuit for controlling the operation of said motor, an automatic mechanism, said automatic mechanism including a plurality of switches in said circuit, movable means in engagement with said cable for closing one of said plurality of switches to cause said drum to wind in cable when said movable means is actuated in one direction, adjustable means for actuating said movable means against the pressure exerted thereon by said cable, said movable means being actuated in the reverse direction by said cable to effect closing of a second of said plurality of switches to reverse said motor thereby causing said drum to pay out cable when the pressure imposed on said movable means by said cable exceeds that imposed thereon by said adjustable means, a normally closed control switch in said circuit, means operated by said drum for opening said last mentioned switch when a predetermined length of cable extends between said drum and the object in tow, a second movable means engaging said cable for closing a third of said plurality of switches to cause said motor to actuate said drum to wind in cable when undue slack occurs therein, and a pair of limit switches in said circuit for stopping said motor to prevent overtravel of said drum in either direction.

3. In a towing device, the combination of a winch including a cable winding drum, and an electric motor for actuating said drum to wind in or pay out cable, an electric circuit for operating said motor, manually operable switch means in said circuit for controlling the operation of said motor, an automatic mechanism, said automatic mechanism comprising a plurality of switches in said circuit, movable means in engagement with said cable for closing one of said plurality of switches to cause said drum to wind in cable when said movable means is actuated in one direction, fluid motor means for actuating said movable means against the pressure exerted thereon by said cable, said movable means being actuated in the reverse direction by said cable to effect closing of a second of said plurality of switches to reverse said motor thereby causing said drum to pay out cable when the pressure imposed on said movable means by said cable exceeds that imposed thereon by said fluid motor means, a normally closed control switch in said circuit, means operated by said drum for opening said last mentioned switch when a predetermined length of cable extends between said drum and the object in tow, a pump for actuating said fluid motor, and adjustable control means for said pump whereby the pressure developed thereby may be varied.

4. In a towing device, the combination of a winch including a cable winding drum, and an electric motor for actuating said drum to wind in or pay out cable, an electric circuit for operating said motor, manually operable switch means in said circuit for controlling the operation of said motor, an automatic mechanism, said automatic mechanism comprising a plurality of switches in said circuit, movable means in engagement with said cable for closing one of said plurality of switches to cause said drum to wind in cable when said movable means is actuated in one direction, fluid motor means for actuating said movable means against the pressure exerted thereon by said cable, said movable means being actuated in the reverse direction by said cable to effect closing of a second of said plurality of switches to reverse said motor thereby causing said drum to pay out cable when the pressure imposed on said movable means by said cable exceeds that imposed thereon by said fluid motor means, a normally closed control switch in said circuit, means operated by said drum for opening said last mentioned switch when a predetermined length of cable extends between said drum and the object in tow, a second movable means engaging said cable for closing a third of said plurality of switches when undue slack occurs in said cable to cause said motor to operate said drum to wind in cable, a second fluid motor means for actuating said second movable means, a pump for actuating both of said fluid motor means, and adjustable control means for said pump whereby the pressure developed thereby may be varied.

5. In a towing device, the combination of a winch including a cable winding drum and an electric motor for actuating said drum to wind in and pay out cable, an electric circuit for operating said motor, manually operable switch means in said circuit for controlling the operation of said motor, an automatic mechanism, said automatic mechanism comprising a plurality of switches in said circuit, movable means in engagement with said cable for normally closing one of said switches to cause said winch to wind in cable, a control switch in said circuit, means operated by said drum for opening said control switch when a predetermined length of cable extends between said drum and the object in tow, resilient means for actuating said movable means into engagement with the said one of said plurality of switches, means for adjusting the pressure of said resilient means, said movable means being adapted to close a second of said plurality of switches when the load imposed thereon by said cable is sufficient to overcome the pressure of said resilient means thereby causing said winch to pay out cable, a second movable means engaging said cable and mounted adjacent said first mentioned movable means for closing a third of said plurality of switches when undue slack occurs in said cable to cause said motor to operate said drum to wind in cable, and adjustable resilient means for actuating said second movable means to effect closing of said third switch.

6. A towing device, comprising a winch including a cable winding drum, a motor for operating said drum to wind in and pay out cable, an electric circuit connected to said motor, manually operable switch means in said circuit for controlling the operation of said motor, automatic control means for said motor, said automatic control means comprising a plurality of switches in said circuit, movable means adapted for actuation by said cable in one direction to close one of said plurality of switches to condition said motor to operate said drum to pay out cable and thereby reduce the load on said cable, adjustable power means for actuating said movable means against the pressure exerted thereon by said cable to effect closing of a second of said plurality of switches to cause a reverse operation of said motor and drum whereby the latter winds in cable to take up the slack therein, a control switch in said circuit, means actuated by said drum for operating said last mentioned switch, and clutch means for connecting and disconnecting said last mentioned means from said drum.

7. A towing device, comprising a winch including a cable winding drum, a motor for operating said drum to wind in and pay out cable, an electric circuit connected to said motor, manually operable switch means in said circuit for controlling the operation of said motor, automatic control means for said motor, said automatic control means comprising a plurality of switches in said circuit, movable means adapted for actuation by said cable in one direction to close one of said plurality of switches to condition said motor to operate said drum to pay out cable and thereby reduce the load on said cable, adjustable power means for actuating said movable means against the pressure exerted thereon by said cable to effect closing of a second of said plurality of switches to cause a reverse operation of said motor and drum, whereby the latter winds in cable to take up the slack therein, a normally closed control switch in said circuit, means actuated by said drum for opening said last mentioned switch when a predetermined length of cable extends between said drum and the object in tow, clutch means for connecting said last mentioned means to, and disconnecting it from said drum, and a pair of limit switches in said circuit for preventing overtravel of said drum in either direction.

ROBERT C. LAMOND.